(12) United States Patent
Huang et al.

(10) Patent No.: US 6,446,243 B1
(45) Date of Patent: Sep. 3, 2002

(54) METHOD FOR FUNCTIONAL VERIFICATION OF VLSI CIRCUIT DESIGNS UTILIZING REUSABLE FUNCTIONAL BLOCKS OR INTELLECTUAL PROPERTY CORES

(75) Inventors: Yen-Son Huang, Saratoga; Chia-Huei Lee; Changson Teng, both of San Jose, all of CA (US)

(73) Assignee: Novas Software, Inc., San Jose, CA (US)

( * ) Notice: Subject to any disclaimer, the term of this patent is extended or adjusted under 35 U.S.C. 154(b) by 0 days.

(21) Appl. No.: 09/298,320

(22) Filed: Apr. 23, 1999

(51) Int. Cl.$^7$ ................................................. G06F 17/50
(52) U.S. Cl. ........................ 716/7; 716/2; 716/3; 716/4
(58) Field of Search ................................. 716/7, 2, 3, 4

(56) References Cited

U.S. PATENT DOCUMENTS

| | | | |
|---|---|---|---|
| 5,202,889 A | | 4/1993 | Aharon et al. |
| 5,331,568 A | | 7/1994 | Pixley |
| 5,416,719 A | | 5/1995 | Pribetich |
| 5,491,640 A | | 2/1996 | Sharma et al. |
| 5,517,432 A | | 5/1996 | Chandra et al. |
| 5,535,223 A | * | 7/1996 | Hortsmann et al. ......... 714/744 |
| 5,539,680 A | | 7/1996 | Palnitkar et al. |
| 5,581,781 A | | 12/1996 | Gregory et al. |
| 5,594,656 A | | 1/1997 | Tamisier |
| 5,774,370 A | | 6/1998 | Giomi |
| 5,774,380 A | | 6/1998 | Pickup et al. |
| 5,867,399 A | * | 2/1999 | Rostoker et al. ............... 716/18 |
| 5,983,224 A | * | 11/1999 | Singh et al. .................... 707/6 |
| 6,035,109 A | * | 3/2000 | Ashar et al. .................... 716/3 |
| 6,086,626 A | * | 7/2000 | Jain et al. ....................... 716/5 |
| 6,102,961 A | * | 8/2000 | Lee et al. ....................... 716/1 |
| 6,145,073 A | * | 11/2000 | Cismas ......................... 712/25 |
| 6,157,947 A | * | 12/2000 | Watanabe et al. ........... 709/217 |
| 6,167,556 A | * | 12/2000 | Sun et al. ....................... 716/3 |
| 6,170,072 B1 | * | 1/2001 | Moriguchi et al. .......... 714/724 |
| 6,182,258 B1 | * | 1/2001 | Hollander .................... 714/739 |
| 6,199,031 B1 | * | 3/2001 | Challier et al. ............... 703/14 |
| 6,223,274 B1 | * | 4/2001 | Catthoor et al. .............. 712/34 |
| 6,249,893 B1 | * | 6/2001 | Rajsuman et al. ........... 714/741 |
| 6,269,467 B1 | * | 7/2001 | Chang et al. ................... 716/1 |

OTHER PUBLICATIONS

Stefan Pees et al., On Core and More: A Design Perspective for Systems–on–a–Chip, IEEE International Conference on Application Specific Systems, Architectures and Processors, pp. 448–457, Jul. 14, 1997.*

Rincon et al., Core Design and System–on–a–Chip Integration, IEEE Design and Test of Computers, Oct. 1997, pp. 26–35.*

Wang, L., "Automatic Generation of Assertions for Formal Verification of Power PC(Microprocessor Arrays Using Symbolic Trajectory Evaluations", Proc. IEEE/ACM DAC 1998, pp.534–537.

Keating, M. and Bricaud, P., "Reuse Methodology Manual for System–On–A–Chip Designs", Kluwer Academic Publishers, 1998.

McCluskey, E., "Logic Design Principles", Prentice–Hall, 1986. (pp 380–393).

* cited by examiner

Primary Examiner—Matthew Smith
Assistant Examiner—A. M. Thompson
(74) Attorney, Agent, or Firm—Smith-Hill and Bedell

(57) ABSTRACT

Computer-assisted apparatus/method functionally verifies circuit design through automatic generation of verification rules from reusable functional block or IP core using logic simulator and input stimuli. Rule base captures set of design states or scenarios.

18 Claims, 5 Drawing Sheets

METHOD FOR FUNCTIONAL VERIFICATION OF VLSI CIRCUIT DESIGNS UTILIZING REUSABLE FUNCTIONAL BLOCKS OR INTELLECTUAL PROPERTY CORES

FIELD OF INVENTION

Invention relates generally to functional verification of integrated circuit designs, particularly to verification of very large scale integrated-circuits (VLSI) comprising complex functional blocks, including intellectual property (IP) cores.

BACKGROUND OF INVENTION

Advances in circuit design and fabrication technologies enable designers to pack millions of transistors on single integrated circuit chips. Designs of such complexity typically require effort of team size ranging from few to hundred designers. In the design process, computer-aided design or engineering (CAD/CAE) tools are used to define and verify circuits as design process progresses. Good design practice also follows modular design style, whereby design is broken-down into smaller, more manageable functional blocks. Such sub-blocks are assigned to smaller teams of engineers, such that teams proceed in parallel to design and verify sub-blocks. Separately designed and verified functional blocks are then integrated to define whole circuit.

Logic simulation may be used to verify chip designs, both at block and chip levels. Simulators may support hardware description languages (HDL), used to formally describe chip designs. Such languages include set of basic elements. Built-in simulator instructions model stimulus and response behavior of basic element types. Verification process involves providing stimuli (i.e., pattern vectors), in cycle-by-cycle manner as external inputs to subject block or chip.

Input vectors are provided for simulation, along with HDL description of subject design. Based on modeling of behavior of basic elements used in subject design and interconnection or interaction among such basic elements, simulator determines outputs to be generated by subject design. Functional verification then serves to verify whether simulator-generated values match results that subject design is expected to produce. Typically, large sequences of input vectors are created to verify correct design functionality.

Unrelenting rise in design complexity results in modular design approach, whereby multiple design teams develop and verify functional sub-blocks, which are then integrated to create final system design. To enhance design productivity and make development of highly complex integrated circuits (i.e., so-called system-on-a-chip (SoC) integrated circuits) manageable, sub-blocks may be provided as reusable cores for other circuit designs. SoC reuse approach is appropriate where certain functional block performs well-defined, commonly-needed function, such as popular processor core, special D/A or A/D converter, standard bus interface, or such block implements special algorithms such as MPEG decode.

In this manner, so-called intellectual property ("IP") cores are provided for developing reusable core modules for licensing to other companies, without necessarily building circuit products. Circuit design employing reusable cores may be referred to as core-based" design, regardless whether such cores are developed for same design, taken from previous design, or licensed from other design source.

In core-based design, individual cores may be developed and verified independently as stand-alone modules, particularly when IP core is licensed from external design. source.

To verify module design, core development team creates set of test vectors to simulate and exercise subject design, performed at core interface level, and input/output (I/O) signals at such level are not observable externally from such chip.

Upon system chip integration, regardless of such cores being developed in-house or sourced externally, another set of test vectors are created, preferably based on I/O signals and chip external interface for integrated design verification. Test vectors developed for module-level verification are typically not used at chip level, and original development team understanding of proper core functioning is not necessarily provided to benefit integration verification phase, particularly when core is externally sourced. Further, design problems arising during integration often result from functional interaction between cores. Hence, misunderstanding may significantly contribute to design mistakes during such integration phase, typically being phase of increased time pressure.

Reusable or IP-core based design involves thorough block-level verification. Comprehensive input stimuli are applied to subject circuit using simulation to exercise design adequately. Stimuli application drives subject circuit through successive states, e.g., 0/1 status of storage elements in subject design. If verification is deemed complete, then states traversed by applying stimuli are considered legitimate-states, and such core is passed on for real operation. Such data represent knowledge base associated with proper functioning of subject core module. Applying such knowledge base may be useful for subsequent integration verification process.

During integration stage, IP cores are brought together, and chip-level verification commences. Stimuli needed to drive functional blocks, instead of being provided by external means, derive from outputs of other functional blocks with which subject block may interact. In similar manner, outputs of certain block, which previously needed to be verified externally, serves as input stimuli driving other interacting blocks. No immediate validation is typically provided as to whether each functional block operates properly.

As stimuli are applied during chip-level simulation, entire chip, as well as each of functional blocks, passes through successive operating states. From perspective of functional block, operating state external to set of legitimate states may indicate following conditions:

(i) True Error: Stimuli as provided by surrounding interacting blocks steer block to undesignated state. Upon such occurrence, subsequent operations of such block may not produce proper result. If such occurrence is undetected and flagged, undesired behavior of such block may propagate to other interfacing blocks, thereby leading to other error conditions. However, circuit location where problem occurs may be far from where such condition originates, i.e., in terms of space or time.

(ii) False Error: State has not occurred during module verification.

However, such condition is legitimate, and poses no problem to correct design functionality.

(iii) Un-exercised State: This refers to state that has not occurred during block level verification, but may indicate design problem. Hence, user is notified of such occurrences for further analysis of design logic.

Recent attempts provide tools to enhance quality or quantity of verification coverage or aid in operation of verification process. For example, various code coverage tools analyze simulation runs to measure percentage of HDL code traversed during simulation. While providing useful measurement of degree of verification thoroughness, code coverage technique actually focuses more on form rather than design substance.

Further, hardware verification language ("HVL") is used to enable designers to specify more conveniently verification operations for subject design, thereby complementing HDLs used to specify subject design. However, HVL technique focuses on easing test vector generation task. Development or coding of verification specification is largely tedious, manual operation.

SUMMARY OF INVENTION

Invention resides in computer-implemented apparatus and/or method for functional verification of integrated circuit design. Preferably, present approach provides automatic generation of system or circuit design from reusable functional block or IP core using logic simulator and set o[0086] input stimuli, and rule base which captures set of states or scenarios.

Occurrence of each state allows designer to conclude either: (i) usage of module is legitimate and proper, (ii) misuse of module has occurred, or (iii) usage has taken module to state that designer has not expected. Rule base is embedded in module to create effectively intelligent core. When collection of core modules for chip design are brought together during integration phase, intelligence embedded in rule bases may aid in integration verification process.

Preferred implementation uses computer or software-based system that analyzes functional block using logic simulator and set of pattern vectors to derive set of rules (i.e., rule base) to aid in chip design verification during integration testing. Operations performed by such computer system include automatic categorization of types of logic contained in subject design, automatic recognition of finite state machines (FSM), automatic partitioning of subject design into logic clusters, and automatic generation of rule base for later use in integration verification. During integration testing, exerciser module uses rule bases embedded in functional blocks to identify potential mistakes in operations of and interactions among subject design modules.

DETAILED DESCRIPTION OF PREFERRED EMBODIMENT

Figure 1:
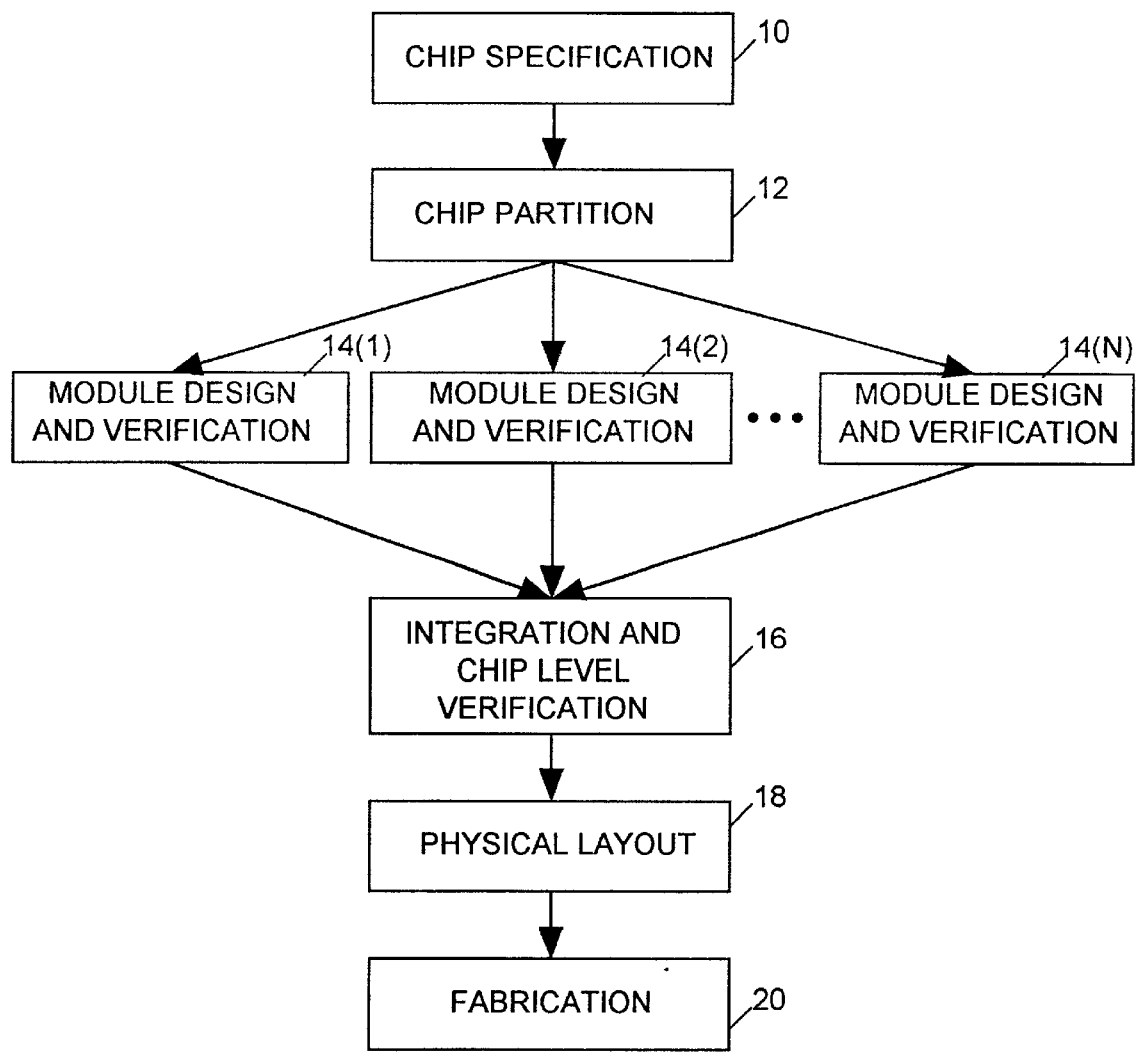
FIG. 1 is flow diagram showing circuit development process, including steps of chip-level functional block partition, functional block design and verification, integration and chip-level verification, physical layout, and fabrication.

Preferred process flow for implementing circuit or system development is shown in FIG. 1. Initially, circuit or system specification 10 is provided to define generally functions which subject chip is intended to perform. Then, high-level functional partition 12 is performed thereon to partition subject design into smaller circuit portions or sub-blocks. Preferably, sub-blocks provide clean, minimal circuit or signal interface, i.e., with necessary signal interconnect or interactions therebetween.

Further, each such sub-block preferably includes relatively high functional design content, whereby significant functional complexity is provided in each partitioned block. In this distributed manner, each block partition may be provided to an engineering team for design and verification. System-level partitioning preferably allows each designer team to proceed with development independently of other groups, since block partitioning provides substantial design content in each circuit partition.

After system partition, various design teams may proceed to design and verification 14(1–N) of respective modules or sub-blocks. Some functional blocks, which were developed previously, are available for reuse, while some blocks may be obtained from external sources as IP cores.

Figure 2:
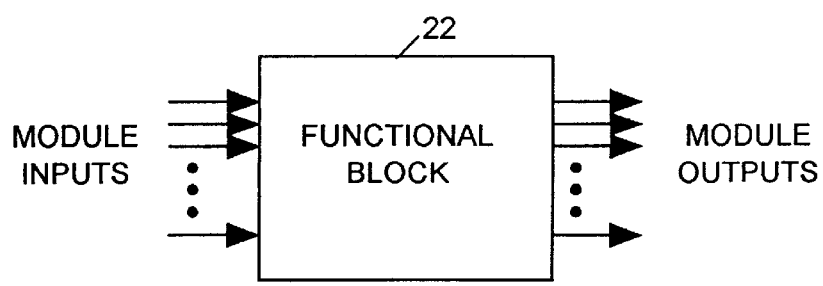
FIG. 2 shows functional block with inputs and outputs through which block interacts with surrounding blocks or outside world.

FIG. 2 shows block level verification, whereby comprehensive set of test vectors are applied to functional block 22 for simulation and functional exercise thereof. Module input vectors may be applied to HDL description of subject design using simulator. Module outputs are generated from such simulator, representing behavior of block design, being available for manual or automatic verification for functional correctness.

Figure 3:
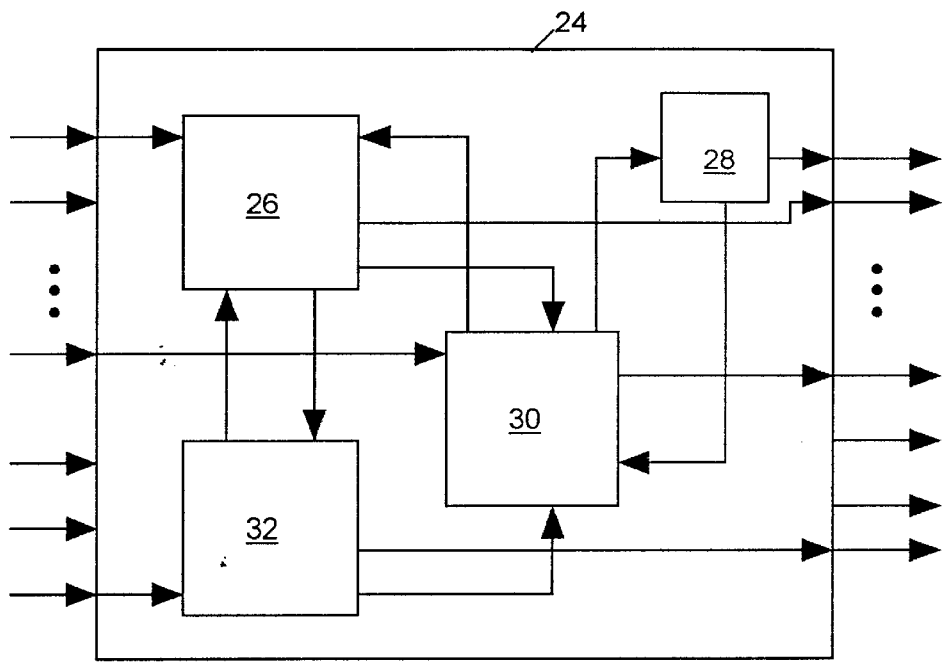
FIG. 3 illustrates integration process in which functional blocks are pieced together, and signals extend to/from externally to chip.

Integration phase 16 follows, in which separately developed blocks are assembled functionally and verified as a whole, for example, as shown in FIG. 3, whereby sub-blocks 26, 28, 30, 32 are integrated as system or chip design 24. New set of test vectors may be created, representing inputs to subject design at integrated chip or system level, and again applied iteratively to such integrated design using simulation. Similarly, simulator outputs may be checked for proper functioning of integrated design. Once subject design is checked to meet functional and performance objectives, development process proceeds to generate physical layout 18 for mask preparation and fabrication 20 of subject integrated circuit.

Figure 4:
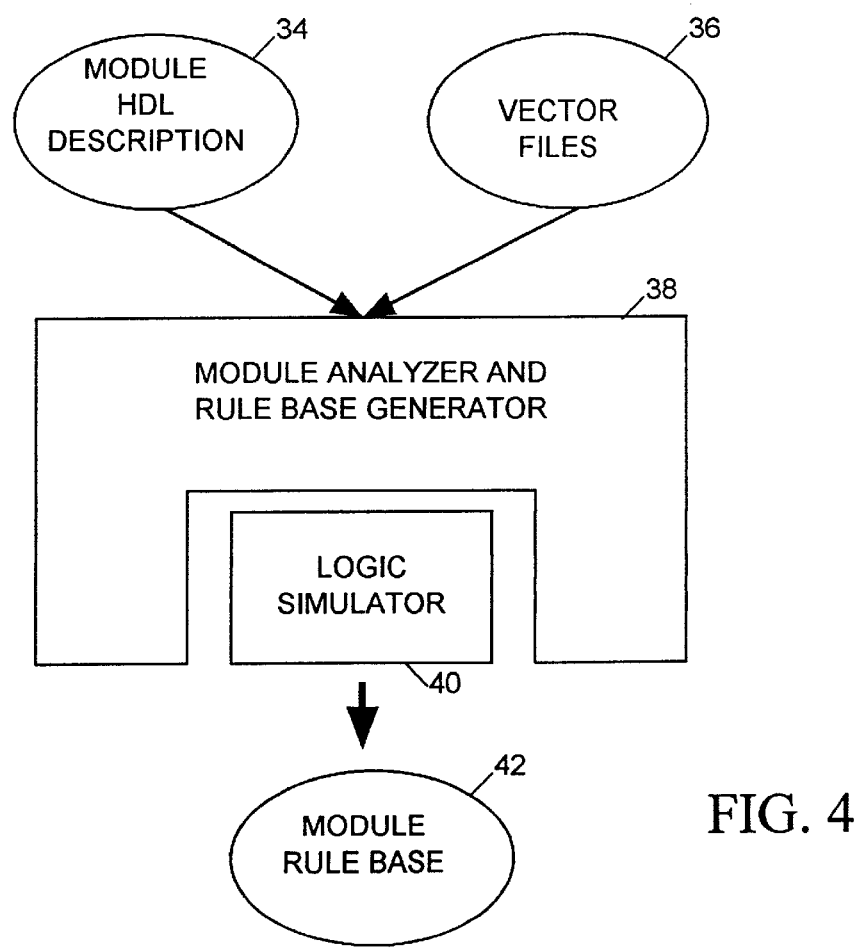
FIG. 4 illustrates operation of module analyzer that is part of invention.

FIG. 4 shows schematic operation of module analyzer and rule base generator 38 according to present invention, for application to subject design during block-level verification. Module HDL description 34 of subject block design and vector file 36 containing set of input stimuli, as well as logic simulator 40, such as Verilog-type from Cadence Design Systems, are provided, such that module analyzer and rule-based generator analyzes subject circuit design according to process described herein.

Figure 5:
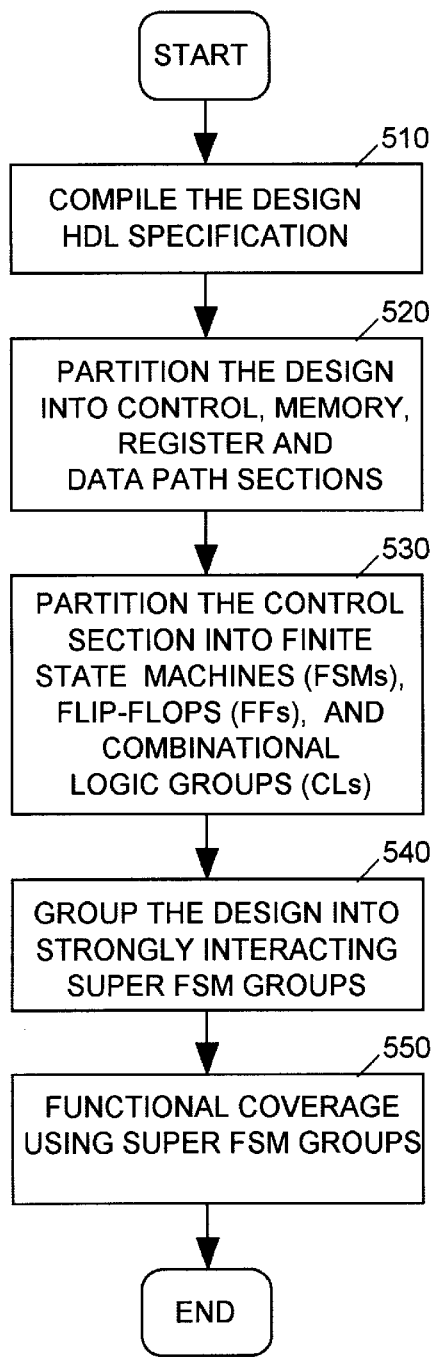
FIG. 5 is flow diagram showing block-level design and verification process.

Logic simulator 40 runs simulation of subject design block, then module analyzer 38 performs analysis to derive module rule base 42 for subject module. FIG. 5 describes steps performed by module analyzer and rule-base generator 38. Initially, HDL specification of subject block design is provided and compiled 510 into intermediate format. Compilation may be performed automatically through software instructions or manually. Analyzer 38 then partitions 520 subject design into control, memory, register, and/or datapath circuit sections.

Preferably, partitioned control sections are categorized 530 further into finite state machines (FSM), flip-flops (FF or registers), and/or combinational logic groups (CL). Identification of FSMs may be accomplished automatically with software, or manually by user. Logic or functional circuit entities may be interconnected by signals or connections serving as input or output signals.

Generally, FSMs are used in system or circuit design to implement complex decision sequences, whereby FSMs may interact with each other to achieve desired control behavior, although enumerating all possible functional behaviors or conditions that can occur for certain FSMs is not practical. Preferably, automatic technique is used to: identify or group 540 strongly or more relevantly interacting FSMs, cluster such FSMs into "super" FSM groups, and provide information regarding super FSM groups. Then, for a set of simulation results, including captured internal state values, functional coverage analysis is performed 550 for super FSM groups in addition to individual FSMs.

Figure 6:
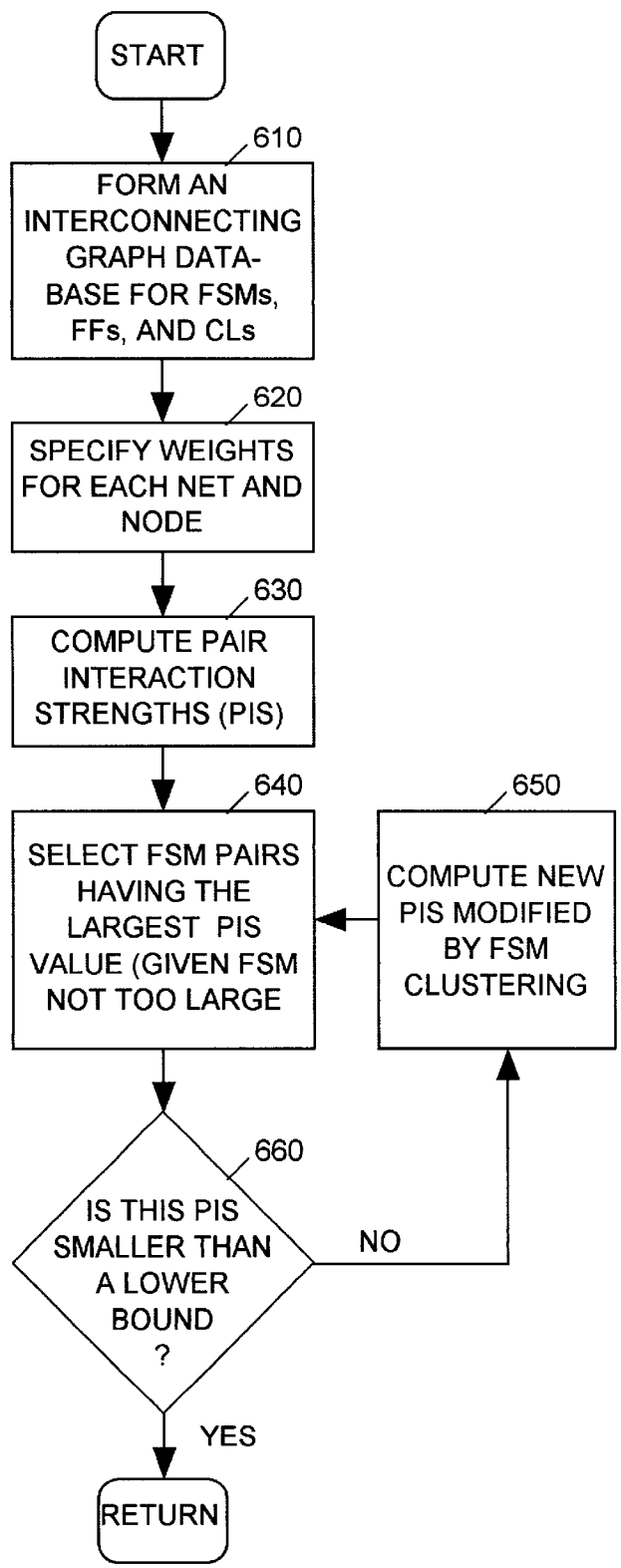
FIG. 6 is flow diagram showing partitioning process to create super FSM groups.
Figure 7:
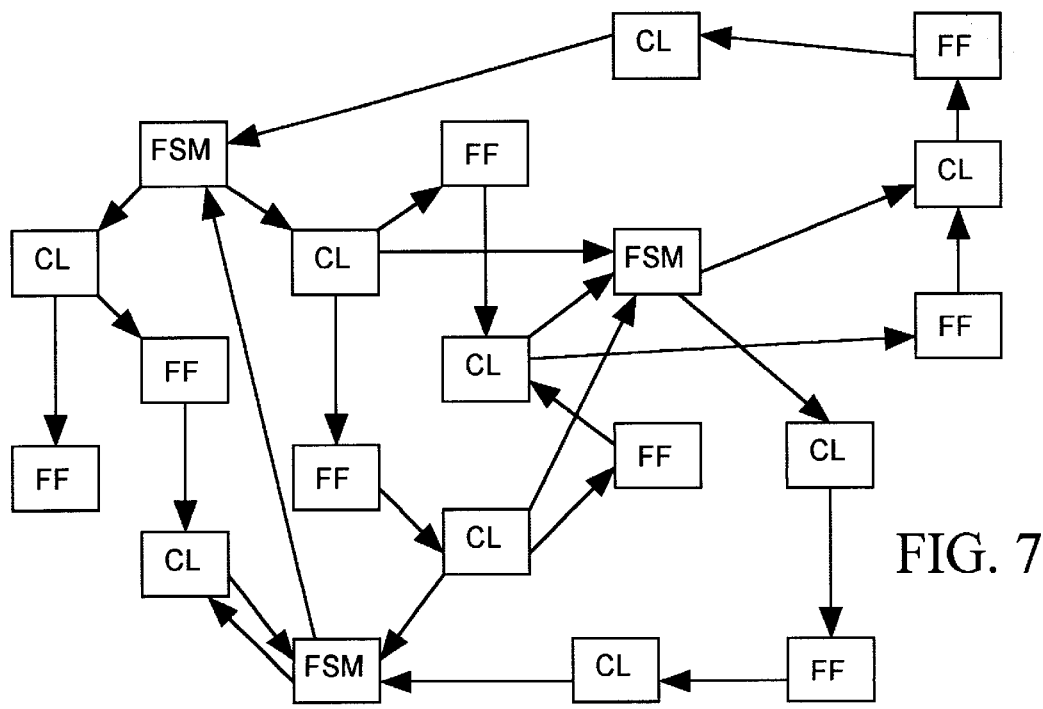
FIG. 7 illustrates classification of design elements into FSMs, FFs, and CL groups, with interconnections shown as arcs of directed graph.

FIG. 6 shows flow diagram of procedure steps by module analyzer and rule-base generator 38 for partitioning strongly interacting FSMs into super FSM groups. Initially, interconnected network graph database is generated 610. Graphical network nodes represent logic or functional circuit entities of FSMs, FFs, and/or CLs. Network arcs, which may be directional, represent signal flows between such entities. For example, FIG. 7 illustrates interconnected network graph.

Then, FSMs are partitioned, whereby resulting groups of FSMs, including FFs and CLs that are absorbed into such clusters or groups, are identified as super FSM groups.

Weights are assigned 620 to FSMs, FFs, and CLs according to prescribed functions, such as:

$$Wt(FSM)=k1*(number\ of\ states)+k2*(number\ of\ inputs)+k3*(number\ of\ outputs)$$

$$Wt(FF)=k4$$

$$Wt(CL)=k5*(number\ of\ inputs)+k6*(number\ of\ outputs)$$

Note: k1–k6 and kk1, kk2 are constants preset by computer program with consideration for design styles and examples as follows. User may reset such constant values as necessary.

Then, FSM pair interaction strength (PIS) is determined 630 according to prescribed functions such as:

$$PIS(FSM1, FSM2)=(Path\ strengths\ from\ FSM1\ to\ FSM2)+(Path\ strengths\ from\ FSM2\ to\ FSM1)+(kk1/(Wt(FSM1)+Wt(FSM2))).$$

where path strength for path from FSM1 to FSM2 is defined as:

$$kk2/(sum\ of\ the\ weights\ of\ on\mbox{-}path\ FFs\ and\ CLs)$$

and path is defined as signal flow route from one FSM to another FSM. To reduce CPU run time, upper bound for path length (e.g., measured by total number of FFs and CLs) can be set to limit search space for possible paths. PIS function is modifiable per design style or user request.

FSM pair having largest PIS value is then selected 640 to form super FSM group with FFs and CLs therebetween. If selected FSM is too big relative to specified criteria, such as total number of states or input/output terminals being too large, then FSM pair with next largest PIS value FSM pairs is chosen instead. User may guide selection by specifying FSM pairs to be. merged explicitly. Optionally, directly connected FSMs are selected for merging.

FSM coverages, which include nodes or states and arcs or state transitions may be used as selection criteria. If high-coverage sets of simulation results are provided, FSM coverage for merged FSM may be determined. Coverage criteria may be designated, such that if FSM coverage percentage for merged FSM is smaller than specified lower bound, FSM interactions are deemed not strong enough to merge, thus such FSMs are not merged.

Procedure may iterate until PIS values are determined 660 to be below prescribed lower bound, and when determined that PIS is not smaller than lower bound, new computed PIS value may be modified 650 by FSM clustering. Once strongly interacting FSM groups are identified, various FSM manipulation techniques may be used to compute all accessible states of selected strongly interacting FSM group. Accessible states are obtained from initial states, usually entered after reset. Because of strong FSM interactions, merged FSMs may have fewer accessible states or state transition arcs.

Figure 8A:
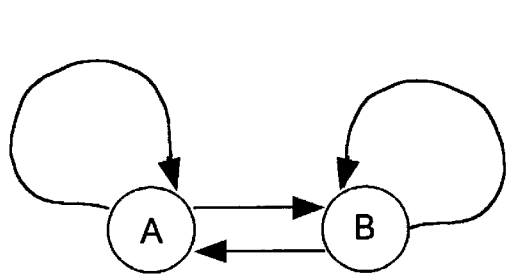
FIG. 8 illustrates partitioning or clustering of FSMs to form super FSM group.
Figure 8B:
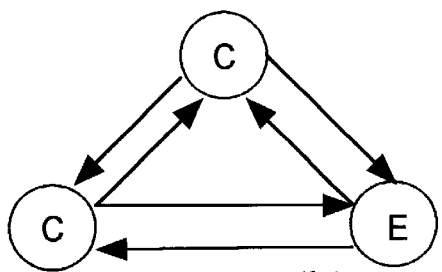
Figure 8C:
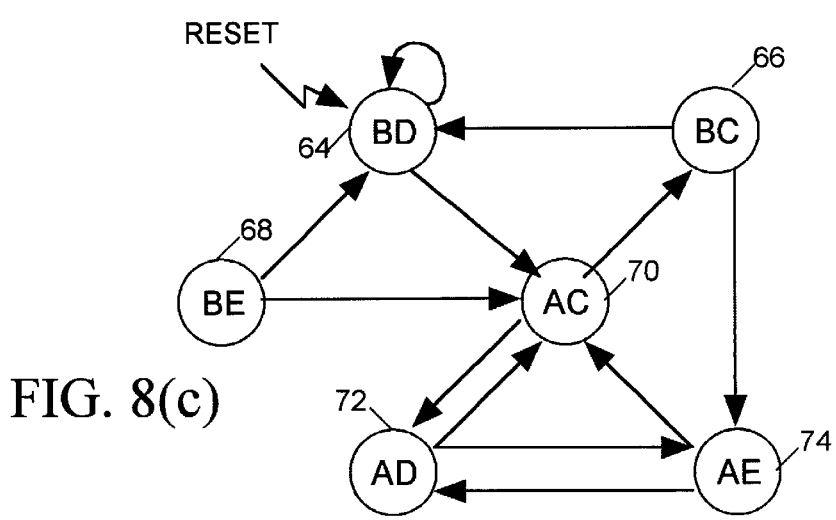

For example, FIG. 8 shows FSM(a) 54~56 and FSM(b) 58~60 being merged to become FSM(c)64~74. Referring further to state diagram (c) with states (bd) 64, (bc) 66, (ac) 70, (ad) 72, (ae) 74, some states (e.g., BE) are inaccessible and some state transition arcs (e.g., BE→AE) become forbidden. Such states may help designers to detect exception cases.

Furthermore, assuming that verification vectors are sufficiently complete, functional coverage analysis may be conducted for super FSM groups, given set of simulation results, including captured internal state values, as follows:

Initially, scan through simulation results, preferably with all states recorded, to mark visited states in strongly interacting super FSM groups. Then, check all marked and visited states against accessible states of strongly interacting super FSM groups, and flag all unvisited accessible states of selected strongly interacting super FSM group as potential coverage problems.

Figure 9:
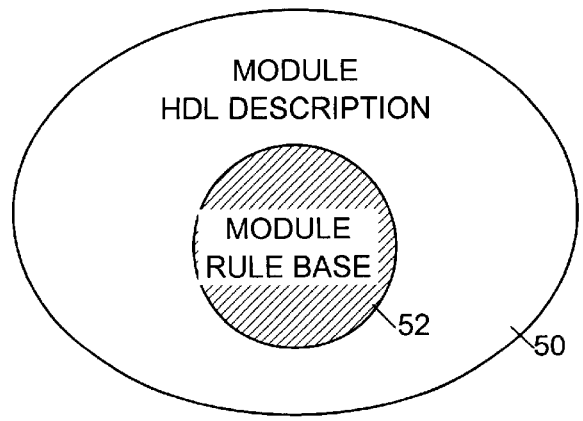
FIG. 9 shows intelligent core comprising HDL specification and rule base of functional block design.

FIG. 9 shows module HDL specification 50 of subject block design, including module rule base 52, thereby forming intelligent core logic or circuit functional entity. Rule base 52 serves to capture design intent of subject block or core, as embodied in test vectors used to verify such design.

Figure 10:
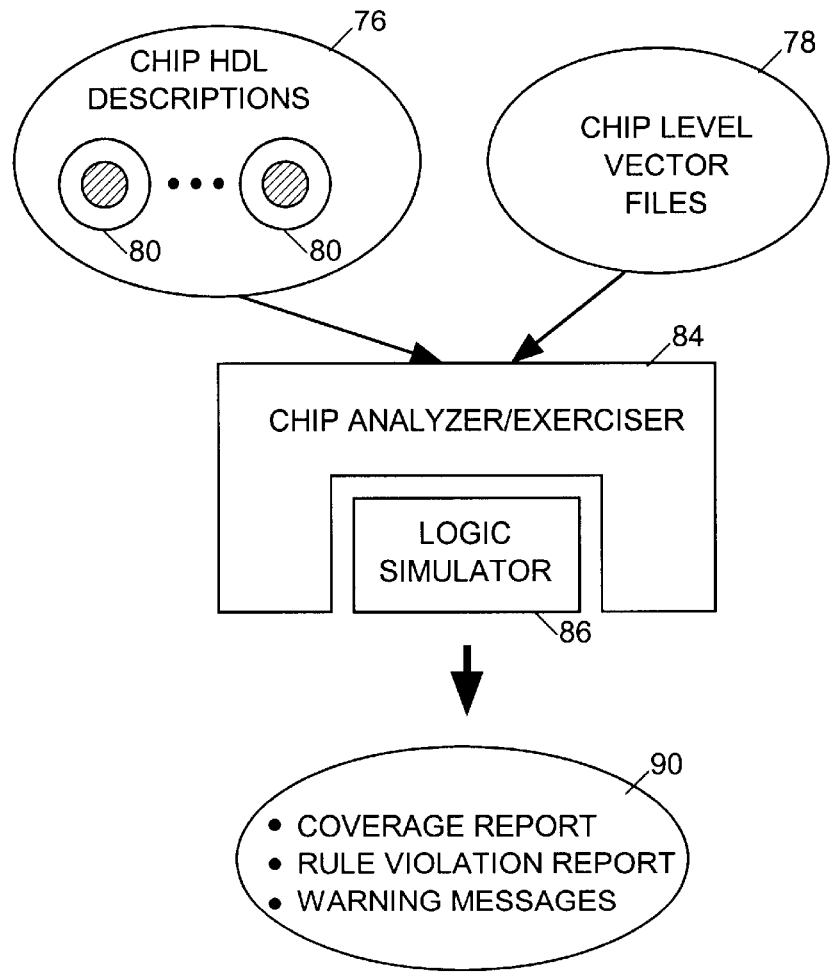
FIG. 10 illustrates operation of chip analyzer and exerciser.

FIG. 10 shows schematic operation of subject chip analyzer/exerciser 38, 84 for integration verification. Chip HDL descriptions 34, 80, 76 and chip level vector files 36, 78 are provided to chip analyzer/exerciser 38, 84 and logic simulator 40, 86, whic[0088] may generate coverage report, rule violation report, warning messages, or other design module rule base verification information 42, 90.

Effectively serving as design environment for driving chip-level. simulation, chip analyzer/exerciser 38, 84 monitors traversal of FSM states in each core module and checks such monitored information against knowledge stored in core rule base. Violation of intended design functionality can be identified and provided to user, preventing violation from propagating to other areas of subject design, possibly manifesting much later in time and more obscure manner.

Foregoing described embodiments of the invention are provided as illustrations and descriptions. They are not intended to limit the invention to precise form described. In particular, Applicants contemplate that functional implementation of invention described herein may be implemented equivalently in hardware, software, firmware, and/or other available functional components or building blocks. Other variations and embodiments are possible in light of above teachings, and it is thus intended that the scope of invention not be limited by this Detailed Description, but rather by Claims following.

What is claimed is:

1. A method for functional verification of circuit designs using reusable blocks or intellectual property cores, the method comprising steps of:

providing one or more functional block or intellectual property core circuit design;

generating from the provided function blocks or intellectual property core circuit designs a rule base; and verifying according to the rule base a functionality of an integrated circuit comprising the provided functional blocks or intellectual property core circuit designs, wherein the generating step comprises the steps of:

categorizing one or more logic included in the provided functional blocks or intellectual property core circuit designs into a control, memory, register or datapath portion; and grouping logic of the control portion into a plurality of finite state machines (FSMS) in a manner that substantially minimizes a number of interactions among the FSMS.

2. The method of claim 1 wherein the grouping step comprises the steps of:

identifying FSMs in the control portion;

constructing a connectivity graph representing one or more connecting signal paths associated with the identified FSMs; and combining selected ones of the identified FSMs having one or more relatively short signal path lengths to provide a reduced number of FSMs, the FSMs being combined in a manner that substantially minimizes a number of interactions between FSMs, the combined FSMs being defined by one or more storage elements and a combinational complexity along the signal paths.

3. The method of claim 2 further comprising the step of:

generating one or more coverage rules automatically from the provided functional blocks or intellectual property core circuit designs associated with said combined FSMs.

4. The method of claim 3 wherein:

the coverage rules are determined using a logic simulator and a set of test vectors.

5. The method of claim 4 wherein:

the coverage rules are determined according to the following steps:

running a simulation using a hardware design language specification associated with a super FSM grouping and the test vector set;

collecting simulation results; and deriving the coverage rules from a constructed state or state transition utilization table.

6. A method for functionally verifying a design of a logic circuit comprising interacting logic including flip-flops, combinational logic and other logic that can be characterized as implementing finite state machines (FSMs), the method comprising the steps of:

a. identifying a plurality of FSMs implemented by the other logic of the logic circuit;

b. processing the design to determine for each identified FSM all states of the FSM that are reachable from an initial state of the FSM;

c. processing the design to perform a simulation of logic circuit behavior and producing simulation results representing the logic circuit behavior;

d. processing the simulation results to determine states visited by each remaining FSM; and e. comparing the visited states determined at step d to the reachable states determined at step b to determine whether any identified FSM failed to visit any of its reachable states during the simulation performed at step c.

7. The method in accordance with claim 6 wherein step a comprises the substeps of:

a1. processing the design to identify a set of FSMs implemented by the other logic of the logic circuit;

a2. processing the design to compute a pair interaction strength for pairs of identified FSMs, wherein the pair interaction strength of each pair of FSMs is an estimate of a rate at which the FSMs of the pair are likely to interact with one another via signal paths therebetween;

a3. redefining a pair of the identified FSMs having a pair interaction strength within a predetermined range, along with any flip-flops or combinational logic in any signal path interconnecting the pair of identified FSMs, as being a single FSM, thereby to reduce a total number of identified FSMs by one; and a4. repeating steps a2 and a3 until each identified FSM pair has a pair interaction strength within the predetermined range.

8. The method in accordance with claim 7 wherein the pair interaction strength of a pair of FSMs is a function of a number of signals each FSM of the pair receives from combinational logic forming signal paths between the FSMs of the pair and a number of signals each FSM of the pair transmits to combinational logic forming signal paths between the FSMs of the pair.

9. The method in accordance with claim 8 wherein the pair interaction strength of a pair of FSMs is also a function of a number of states of each FSM of the pair.

10. The method in accordance with claim 8 wherein the pair interaction strength of a pair of FSMs is also a function of a number of flip-flops included in signal paths between the FSMs of the pair.

11. The method in accordance with claim 7 wherein the pair interaction strength of a pair of FSMs is a function of a number of signals each FSM of the pair receives from combinational logic forming signal paths between the FSMs of thy pair and a number of signals each FSM of the pair transmits to combinational logic forming signal paths between the FSMs of the pair.

12. The method in accordance with claim 11 herein the pair interaction strength of a pair of FSMs is also a function of a number of states of each FSM of the pair.

13. A method of functionally verifying a design of a logic circuit comprising interacting logic including flip-flops and combinational logic and other logic that may be characterized as implementing finite state machines (FSMs), the method comprising the steps of:

a. processing the design to identify a set of FSMs implemented by the other logic of the logic circuit;

b. processing the design to compute a pair interaction strength for pairs of identified FSMs, wherein the pair interaction strength of each pair of FSMs is a number representing an estimate of a rate at which the FSMs of the pair are likely to interact with one another via signal paths therebetween;

c. redefining a pair of the FSMs having a pair interaction strength within a particular range, along with any flip-flops or combinational logic in any signal path interconnecting the pair of identified FSMs, as being a single FSM, thereby to reduce a total number of identified FSMs by one; and d. repeating steps b and c until each identified FSM pair has a pair interaction strength within the particular range.

14. The method in accordance with claim 13 further comprising the step of:

e. processing the design to determine for each remaining FSM all states of the FSM that are accessible from that FSM's initial state.

15. The method in accordance with claim 14 further comprising the steps of:

f. processing the design to perform a simulation of logic circuit behavior and producing simulation results representing the logic circuit behavior; and g. processing the simulation results to determine states visited by each remaining FSM.

16. The method in accordance with claim 14 wherein the pair interaction strength of a pair of FSMs is a function of a number of signals each FSM of the pair receives from combinational logic forming signal paths between the FSMs of the pair and a number of signals each FSM of the pair transmits to combinational logic forming signal paths between the FSMs of the pair.

17. The method in accordance with claim 16 wherein the pair interaction strength of a pair of FSMs is also a function of a number of states of each FSM of the pair.

18. The method in accordance with claim 17 wherein the pair interaction strength of a pair of FSMs is also a function of a number of flip-flops included in signal paths between the FSMs of the pair.

\* \* \* \* \*

UNITED STATES PATENT AND TRADEMARK OFFICE
CERTIFICATE OF CORRECTION

| | | |
|---|---|---|
| PATENT NO. | : 6,446,243 B1 | Page 1 of 1 |
| DATED | : September 3, 2002 | |
| INVENTOR(S) | : Yen-son Huang, Chia-Huei Lee and Changson Teng | |

It is certified that error appears in the above-identified patent and that said Letters Patent is hereby corrected as shown below:

<u>Column 8,</u>
Line 47, "thy" should be deleted and replace with -- the --.

Signed and Sealed this

Fifteenth Day of October, 2002

Attest:

Attesting Officer

JAMES E. ROGAN
*Director of the United States Patent and Trademark Office*